March 11, 1930.  D. SLOTSKY  1,749,784
MECHANISM FOR ADVERTISING DEVICES
Filed July 16, 1928   5 Sheets-Sheet 1
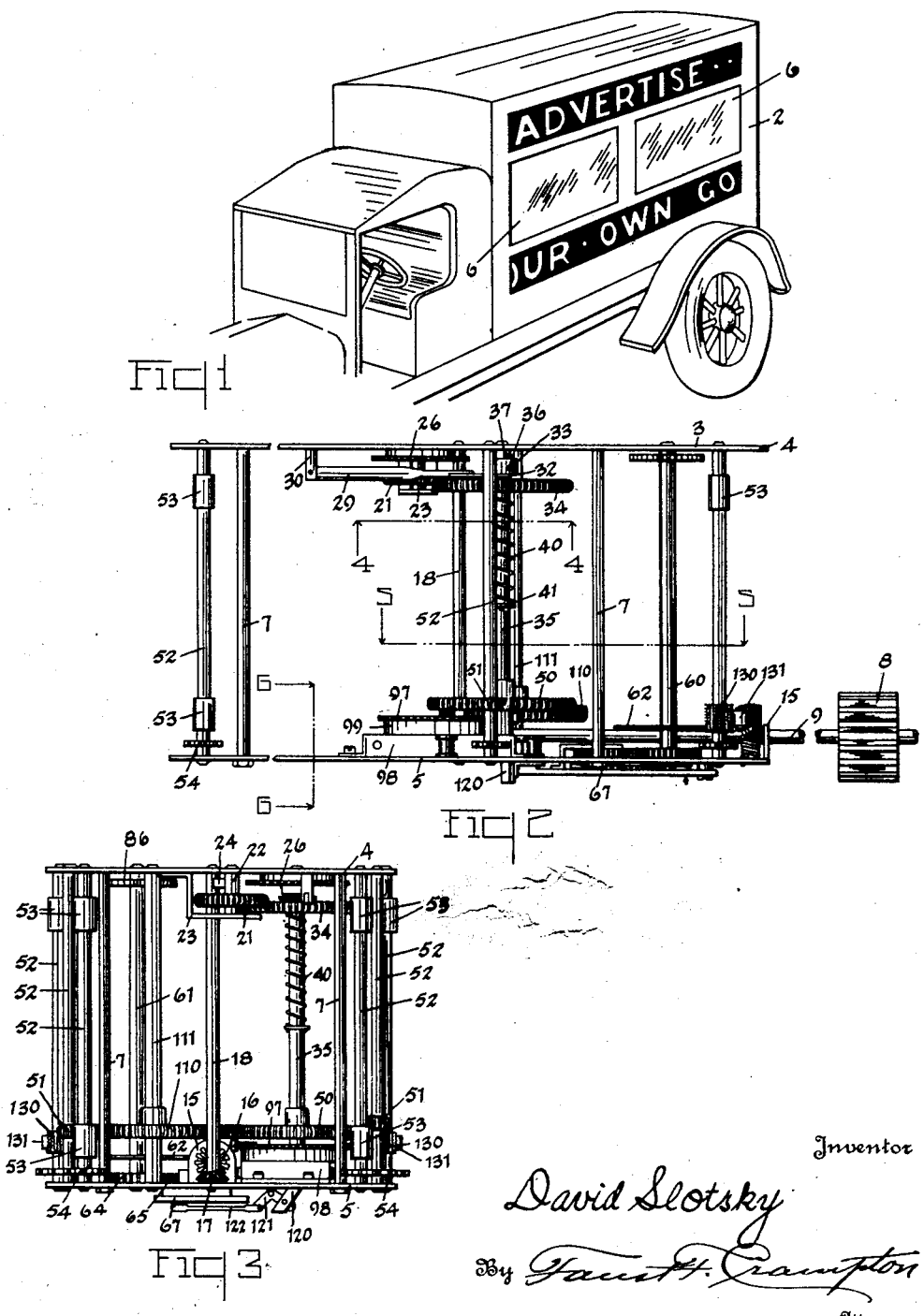

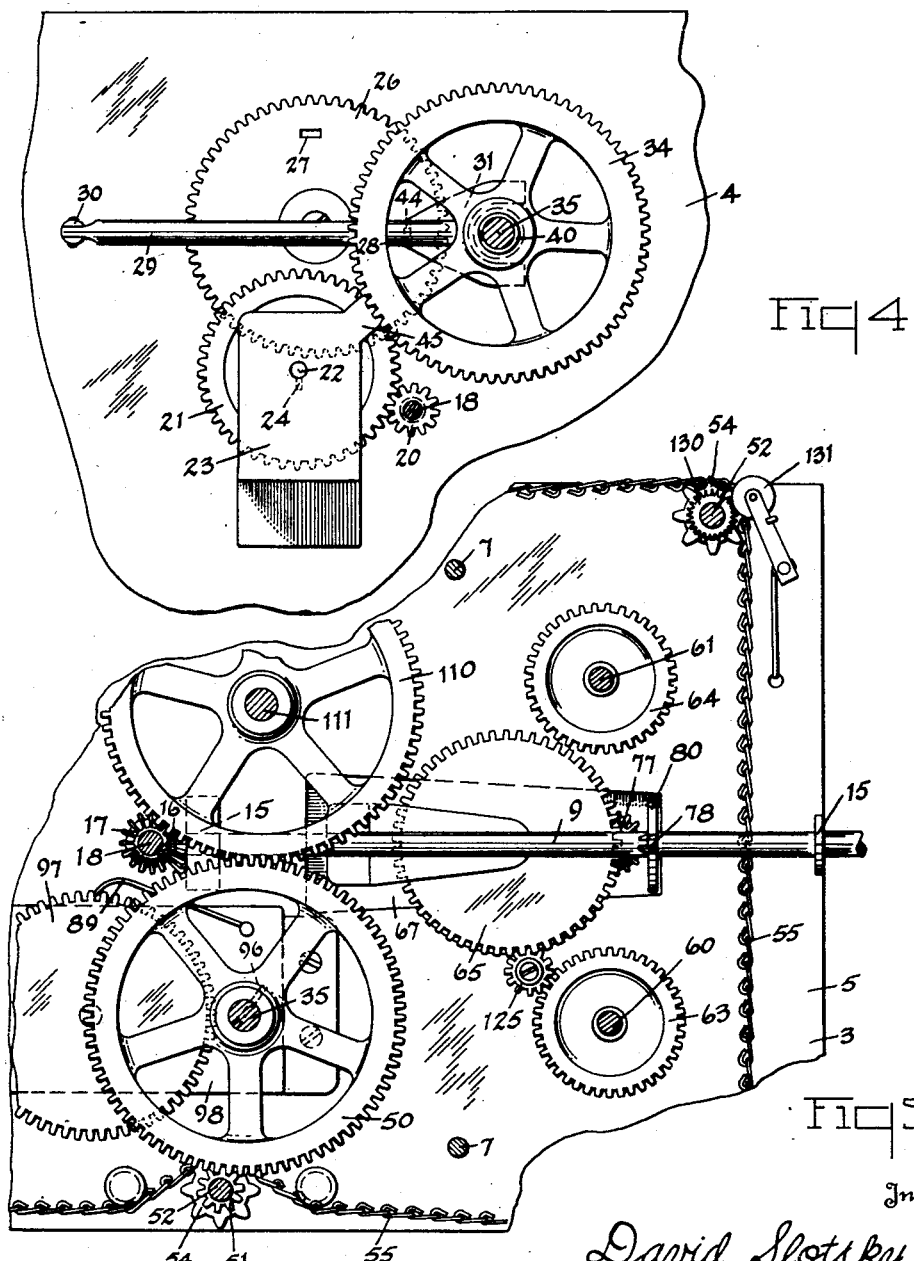

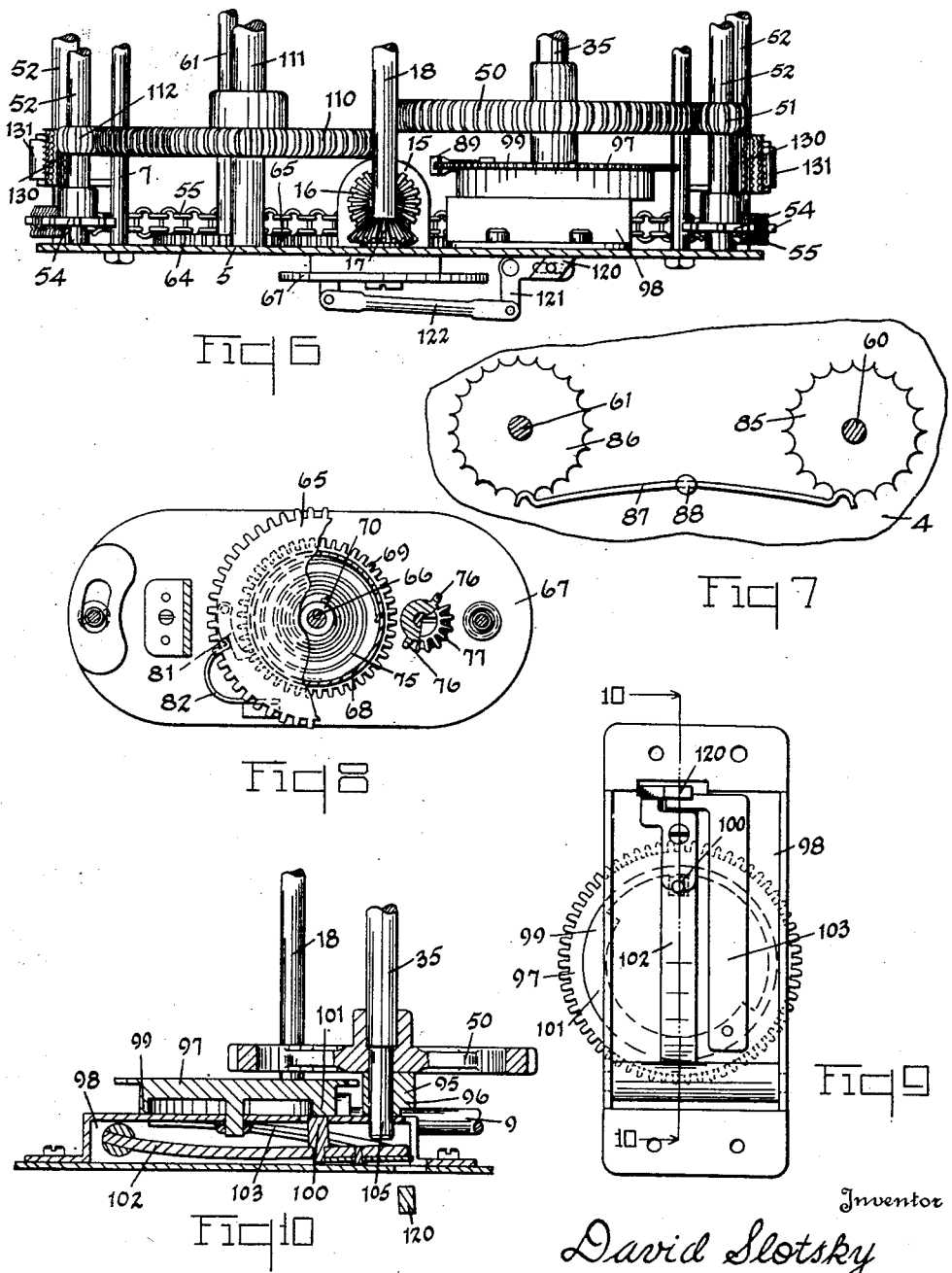

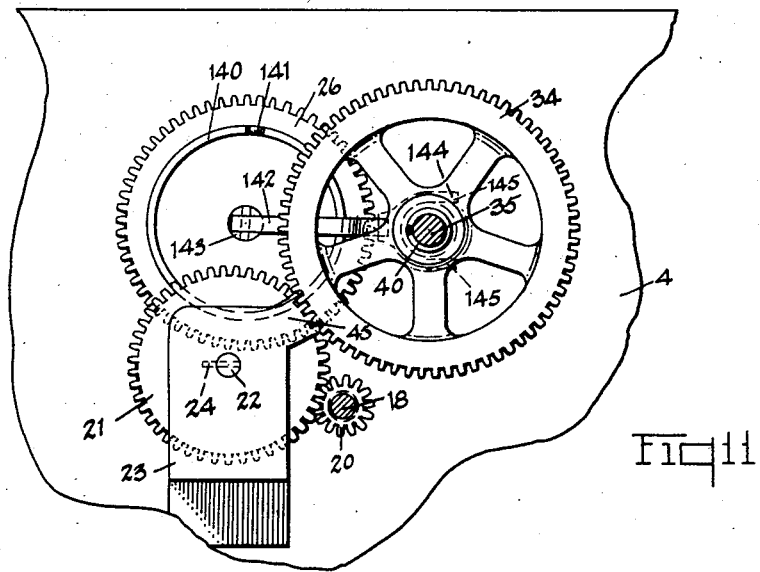
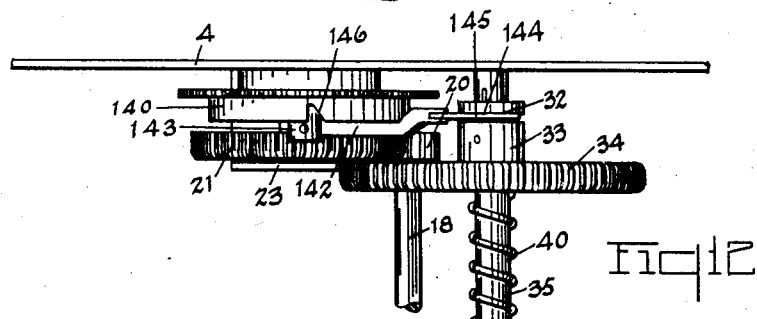
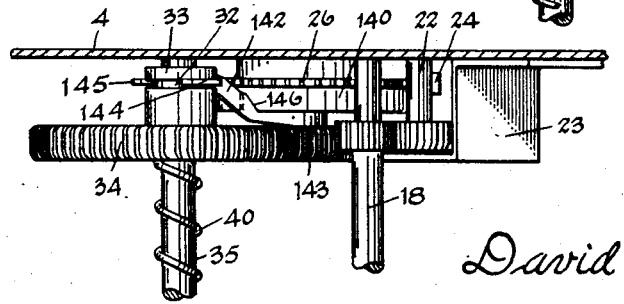

March 11, 1930.  D. SLOTSKY  1,749,784
MECHANISM FOR ADVERTISING DEVICES
Filed July 16, 1928  5 Sheets-Sheet 5

Inventor
David Slotsky
By Faust F. Crampton
Attorney

Patented Mar. 11, 1930

1,749,784

UNITED STATES PATENT OFFICE

DAVID SLOTSKY, OF CLEVELAND, OHIO

MECHANISM FOR ADVERTISING DEVICES

Application filed July 16, 1928. Serial No. 292,952.

My invention has for its object to provide a novel and efficient means whereby strips of material may be progressively moved to place successively arranged groups of subjects before definite areas. The invention also provides for intermittent movement of the strip of the material so that each group of subjects, upon reaching a defined area, may be momentarily halted for purposes of exhibit. In combination with the intermittent progress afforded by the mechanism, there is provided a means for automatically reversing the mechanism so that the movement of the strip, when one end of the strip has been reached, will continue but in the reverse direction.

The invention is particularly useful for the exhibition of advertising matter in the form of characters or pictures on suitable materials and other subjects which may be of interest or benefit to the user. Constructions containing the invention may be mounted on self propelled vehicles and operated by the motor or any other source of power. It also may be used for window advertising.

The invention may be contained in various constructions. To illustrate a practical application of the invention I have selected one form of construction as an example of such constructions and shall describe it hereinafter. The construction selected as an example is illustrated in the accompanying drawings.

Figure 14:
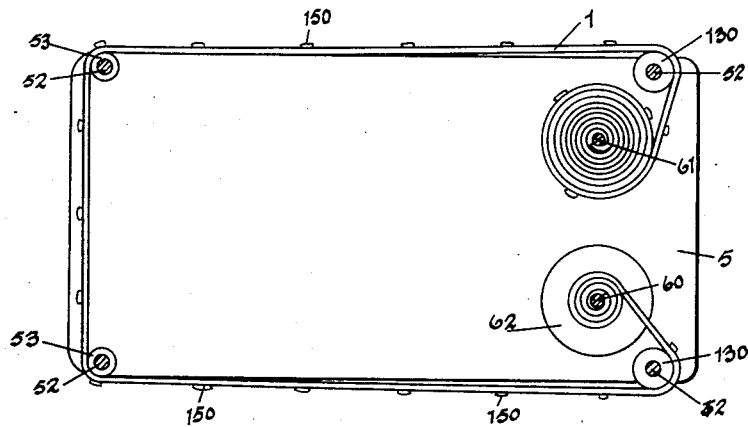
Figure 15:
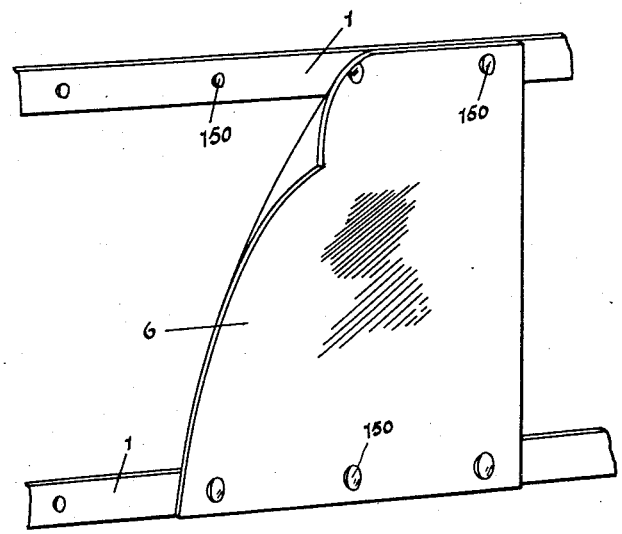

Fig. 1 is a perspective view of a motor truck with the device located in the carriage body. Fig. 2 is a broken side view of the device. Fig. 3 is a front view of the device. Fig. 4 is a view of a section taken on the plane of the line 4—4 indicated in Fig. 2. Fig. 5 is a view of a section taken on the plane of the line 5—5 indicated in Fig. 2. Fig. 6 is a view of a section taken on the plane of the line 6—6 as indicated in Fig. 2. Fig. 7 is a view of a detail of the mechanism. Fig. 8 is a view of a detail of the mechanism. Fig. 9 is an inverted view of another portion of the mechanism. Fig. 10 is a view of a section taken on the plane of the line 10—10 indicated in Fig. 9. Fig. 11 is a view of a modified form of the construction illustrated in Fig. 4. Fig. 12 is a side view of the detail of construction shown in Fig. 11. Fig. 13 is a view of the detail shown in Fig. 12 taken in another direction and having certain of the parts moved to different positions. Fig. 14 is a plan view illustrating the movement of the material around the mechanism. Fig. 15 is a view in perspective illustrating means for removably securing the sheets of advertising material to the supporting strips.

The invention is particularly adapted for the exhibition of sheets of material which may be covered with suitable characters or pictures for purposes of advertising. In the form of construction shown in Fig. 1, the sheets having advertising material are removably connected to the strips 1 and are located so as to be seen through defined open areas in the sides of the truck body 2. The sheets may be formed either of opaque or transparent material and, if transparent material is used, is may be illuminated at night by lamps located within the body 2 of the truck. The strips 1 are supported on and extend around the sides of the frame 3 comprising the plates 4 and 5, that are spaced from each other by a plurality of rods 7. The mechanism which operates to move the strips 1 and the advertising display sheets is also located on the frame 3 and is operatively connected to the motor of the truck by means of a gear 8. The gear 8 is located on a shaft 9 and the shaft 9 extends into one end of the frame 3 where it actuates other parts of the mechanism.

The shaft 9 is supported on the bottom plate 5 of the frame 3 in suitable bearings 15. A bevel gear wheel 16 is secured to the end of the shaft 9 and is meshed with a similar bevel gear wheel 17 on a shaft 18. The shaft 18 is pivotally supported on the bottom plate 5 and extends to the top plate 4. A pinion 20 is secured to the shaft 18 at a point near the plate 4 and meshes with the gear wheel 21 which is secured on a shaft 22. The shaft 22 is pivotally supported on an angle plate 23 that is secured to the under side of the plate 4. Above the gear wheel 21, the shaft 22 is provided with a small plate forming a single tooth 24 and, as the pinion 20 rotates, the gear wheel 21, the tooth 24 is rotated so as to mesh with the teeth of a gear wheel 26. The gear wheel 26 is formed of a solid plate and has an opening 27 formed in the surface and located slightly more than half of the distance from the center to the circumference of the gear wheel. When the gear wheel 26 has been rotated by the gear 24 to a definite point in its rotation, a lug 28 located on an arm 29 enters the opening 27. The arm 29 is pivotally supported at one end in a pin 30 extending downwardly from the plate 4 and the other end of the arm 29 is provided with a yoke member 31. The yoke member 31 is supported in a channel 32 formed in the hub 33 of the gear wheel 34. The gear wheel 34 is supported on a shaft 35 and is connected to the shaft 35 by means of a pin 36 which extends through the hub 33 and through a slot 37 formed in the shaft 35. A spring 40 supports the gear wheel 34 and is supported at its lower end by a washer and a pin 41. As the gear wheels 20 and 21 cause the movement of the gear wheel 26 by the rotation of the single tooth 24, the opening 27 formed in the gear 26 is moved until the lug 28 is forced into the opening 27 by reason of the upward force exerted on the gear wheel 34 and the yoke 31 by the spring 40. This releasement of the spring 40 by reason of the entrance of the lug 28 into the opening 27 forces the gear 34 upwardly and into engagement with the gear wheel 21.

The shaft 35 will then be rotated with the gear wheel 34, by the power transmitted from the gear wheel 8 through the bevel gears 16 and 17, and the gear wheels 20 and 21. The shaft 35 will be rotated until the shaft 22 has again rotated the single tooth 24 into a meshed relation with the gear wheel 26. As the gear wheel 26 is then rotated by the tooth 24, the bevel surface 44 of the lug 28 bears against one end of the opening 27 and moves the lug 28 from its position in the opening. This movement is transmitted by the arm 29 and its yoke 31 to the gear wheel 34, which forces the spring 40 downwards. The gear wheel 34, when located in a position out of engagement with the gear wheel 21, meshes with a number of teeth formed in a projecting gear 45, which is formed on the corner of the angle plate 23 nearest the gear wheel 34 and until the gear wheel 26 has completed one complete rotation and the lug 28 enters the opening 27, the gear wheel 34 and its shaft 35 will be locked in a stationary position. The shaft 35 is provided near its lower end with a gear wheel 50 which meshes with a pinion 51 in order to move the strip 1 the desired distance across the area 6 in the truck body 2.

In order to provide a uniform movement of the sheet material over the entire area of the three sides of the frame 3, shafts 52 are located at equi-distant points along the side and extend between the plates 4 and 5. The shafts 52 are provided with collars 53 formed of substances which will create sufficient friction to slowly draw the sheet material. Also, the shafts 52 are provided with pinions 54 and a chain 55 is located on the engaging teeth of the gear wheels 54 so that, as the chain is moved in one direction, the shafts 52 are each rotated at a uniform speed and in the same direction. The chain 55 is rotated when travelling in one direction by the pinion 51 which is rotated by the gear wheel 50. Thus, the subjects on the strip 1 will be located in a stationary position during the time that the power is being transmitted from the gear wheel 7 through the train of gears above described and until the gear wheel 34 is caused to rotate and, thereby, cause the rotation of the shafts 35, the gear wheel 50 and the pinion 51.

The strips of material are suitably located on the machine in rolls or reels, such as used for ordinary film purposes and the reels are located on the shafts 60 and 61, which are provided with gear wheels 63 and 64 respectively, and are held against rotation by engagement with a gear wheel 65. This maintains a taut condition throughout the length of the strip and thus prevents undue looseness, which would cause bad display of the subject material and impair the operation of the mechanism.

The gear wheel 65 is supported by a stub shaft 66 on a plate 67 that is loosely supported from the under side of the plate 5. The gear wheel 65 is provided with a strip of metal on its under side, which is bent to form a circular wall 68. Between the lower edge of the wall or ring 68 and the upper surface of the plate 67 is a gear wheel 69. The gear wheel 69 has a collar 70 extending upwardly substantially the width of the wall 68 and having an inner bore of sufficient diameter to receive the stub shaft 66. A coil spring 75 is located between the collar 70 and the wall 68 and is connected to the collar and wall by slip connections which release when the spring is coiled too tightly and re-engage when the tension is removed as the spring uncoils. The tension in the spring coils is created by the rotation of the gear wheel 69. The gear wheel 69 is meshed with a two-tooth gear wheel 76 that is formed on the lower end of the boss of a bevel gear 77. The bevel gear 77 is rotated by a plurality of beveled teeth 78 located on the periphery of a wheel 80. The wheel 80 is mounted on the shaft 9 which is driven by the motor of the truck through the gear wheel 8 and, as the wheel 80 revolves, the teeth 78 engage the bevel gear wheel 77 so that as the bevel gear wheel is caused to make a half revolution, one of the teeth of the gear wheel 76 will mesh with the teeth of the gear wheel 69 and as the revolution is completed the second of the teeth 76 will mesh with the gear wheel 69. The gear wheel 69 is secured from backward rotation, caused by the spring 75, by a dog member 81 which engages in the teeth of the gear wheel 69 as it rotates. The dog member 81 is flexibly forced into engagement by means of a spring 82.

The shafts 60 and 61 are also secured against rotation by means of a pair of gears 85 and 86 which are held from rotation by means of a double headed spring 87 secured in a pin 88 located midway between the shafts 60 and 61. Thus, the strips of material 1 which are located in reels on the shafts 60 and 61 are secured against looseness as they are drawn around the machine from one reel to the other.

In order to prevent stripping of the material when one end of the reel has been reached and to reverse the movements thereof, the mechanism provides a means for automatically shifting several of the parts in order that the remainder of the mechanism will operate in the inverse order. The shaft 35, upon which the gear wheels 34 and 50 are located, is provided below the gear wheel 50 with a bushing 95. The bushing 95 has a plate or single tooth 96 formed on one side of its surface. The tooth 96 meshes in its rotations with a gear wheel 97 which is rotatably supported on a rectangular box 98 secured to the plate 5. The gear wheel 97 is locked against backward movement for the engaging of a spring 89 in the teeth of the gear wheel. The shaft 35 is supported on the box 98 between one end and the gear wheel 97. The under side of the gear wheel 98 is provided with a ring or circular wall 99 having an increased width extending around one half of its circumference. A lug 100 bearing against the edge of the wall 99 moves upwardly when moved beyond the thicker portion 101 of the wall 99. The lug 100 is secured in an arm 102 which is pivotally supported in the walls of the box 98. The lug 100 is maintained against the edge of the wall 99 by a flat spring 103, one end of which is secured to the under side of the top of the box, while the other end engages the outer end of the arm 102.

The rotation of the gear wheel 98 will be exceedingly slow and at intermittent periods, since it is caused to operate only when the shaft 35 is rotated so as to mesh the single tooth 96 with the gear wheel 98. Thus, the mechanism will operate at long intervals in either direction since the operation of certain parts of the mechanism is intermittent, as, for example, the rotation of the gear wheel 26 which controls rotation of the shaft 35 and its interconnected parts, and the rotation of the gear wheel 97 which is dependent upon the shaft 35 and which causes the reversal of the sheet material 1.

During the operation of the mechanism so as to cause the gear wheel 50 to operate the pinion 51 and thereby move the chain 55 in one direction, the upper end of the lug 100 is maintained against the under surface of the gear wheel 97. The arm 102 is then in its upper position. In this position, the free end of the arm 102 supports the end 105 of the shaft 35 so that the gear wheel 50 will mesh with the pinion 51. When the gear wheel 97 has been rotated sufficiently to bring the raised portion 101 or wider half of the wall 99 into contact with the lug 100, the lug is forced downwardly against the pressure of the spring 103. The shaft 35 then moves downwardly as the supporting end of the arm 102 drops. The gear wheel 50 is then demeshed from the pinion 51 and meshed with a gear wheel 110. The gear wheel 110 is connected to a shaft 111 pivotally supported between the plates 4 and 5. The gear wheel 110 meshes with a pinion 112. The pinion 112 is mounted on a shaft 52 and on the opposite side of the device from the shaft 52 supporting the pinion 51. Thus, as the mechanism moves so as to operate the shaft 35, the gear wheel 50 rotates the gear wheel 110 and the pinion 112 thereby moving the chain 55 in a reverse direction.

The end of the arm 102 is provided with a finger portion 120 extending at right angles to the plane of the arm. The finger portion 120 is pivotally connected to one end of a bell crank lever 121. The other end of the bell crank lever 121 is connected by a lever 122 to the plate 67. The downward movement of the arm 102 swings the bell crank lever 121 so as to move the plate 67. As the plate 67 is swung from one position to the other, the gear wheel 65 is demeshed with the gear wheel 63 and meshed with the gear wheel 64. The gear wheels 63 and 65 are connected by means of a pinion 125 which causes the gear wheel 63 to move in the proper direction, so as to unreel the strip of material 1. Engagement between the gear wheels 64 and 65 control the unreeling of the strip which has been rolled on the shaft 61 during the movement of the mechanism in one direction.

It is necessary to "time" the length of the strip of material 1 so that when the portion 101 of the wall 99 of the gear wheel 97 has been traversed by the lug 100, the material will again have been rolled onto the shaft 60. The lug 100 is then snapped upwards by the pressure of the spring 103 against the arm 102. The gear wheel 50 demeshes from the gear wheel 110 and at the end of the upward movement meshes with the pinion 51. The plate 67 is also moved so that the gear wheel 65 is moved from its meshing relation with the gear wheel 64 to its engagement with the pinion 125.

In order to provide for accurate movement of the strips of material as it leaves the shafts 60 and 61, the shafts 52, located in the corners of the plates 4 and 5 and nearest the shafts 60 and 61, are provided with burrs 130. The material moves over and around the burrs 130

130 and is maintained against the burrs 130 by spring pressed rubber rollers 131.

In Figs. 11, 12, and 13, is shown a modified form of construction for producing a dwell in the movement of the sheet material for the display of advertisements shown thereon. In its operation, it produces interengagement of the parts of the mechanism which cause the rotation of the shaft 35. The shaft 35 controls the movement of the chain 55 through the gear wheels 50 and 51, or the gear wheels 50, 110 and 112. The gear wheel 26, when rotated by the tooth 24, produces the interengagement of the gear wheels 21 and 34 through the arm 29 and the spring 40 as described above. The shaft 35 will then be rotated, thereby moving the strip 1. The gear wheel 26, which is formed from a solid plate, is provided on its under side with a wide ring 140. The ring 140 has a notch or a groove 141 formed in its lower edge surface. The notch 141 engages the upper surface of an arm 142. The arm 142 is pivotally supported at one end in the bottom of the shaft 143 on which the gear wheel 26 is rotatably mounted. The free end of the arm 142 is provided with a yoke 144. The arms 145 of the yoke 144 extend into the channel 32 formed in the boss 33 of the gear 34. As the single tooth 24 meshes with the gear wheel 26 and thereby rotates the gear wheel 26, the notch 141 is moved to engagement with the upper surface of the arm 142 and, when engagement is thus made, the arm is moved upwardly by the pressure of the spring 40. The spring 40 is located below the gear wheel 34 and exerts an upward pressure on the yoke 144 of the arm 142 so that the arm is maintained on the surface of the ring 140. The releasement of the spring 40 by the upward movement of the arm 142 allows the gear wheel 34 to move from its locked position with the teeth formed in the portion 45 of the plate 23. The gear wheel 34 then meshes with the gear wheel 21 and the shaft 35 will be rotated until the single tooth 24 has moved the gear wheel 26 a sufficient distance to cause the arm 142 to move out of the notch 141. In order to give a quick disengagement of the notch 141 and the arm 142, the side of the notch 146 is formed at an angle and the corresponding or co-relating part of the arm 142 is also formed at an angle so that there will be a free outward movement of the arm when the gear wheel 26 causes this particular part of the operation.

In order to allow easy removal of the sheets of advertising material from the strips, the strips 1 and the sheets are provided with suitable fasteners so that when it is desirable to change the sheets, they may be quickly removed from the strips 1 and new sheets put on in their places. The strips 1 are provided with half of a snap fastener combination 150 and the sheets 6 are provided with the second half of the fastener 150. The fasteners 150 are so located on the strips 1 that the sheets 6 will be so located with respect to the display areas of the truck body 2 that an entire sheet will be seen as the strips 1 are drawn along the side of the mechanism.

I claim:

1. In a display mechanism, sheet material having display matter contained thereon, a pair of rolls for rolling up the sheet material, and a plurality of collars located in spaced relation for operating on the sheet material and to locate the sheet material in position to be displayed, a pair of burrs, means for pressing the sheet material against the burrs, a driving mechanism and a driven mechanism for operating the collars and the burrs, the driving mechanism having means for intermittently operating on the driven mechanism for short periods of time separated by longer periods of time to move the sheet material to expose parts thereof, the driven mechanism having means for reversing the movement of the collars, and a means for operating the rolls to produce a surface movement of the rolls greater than the surface movement produced by the collars, and a frictional release between said last named means and the rolls to maintain the sheet material taut in the vicinity of the rolls.

2. In a display mechanism, sheet material having display matter contained thereon, a pair of rolls for rolling up the sheet material, and a plurality of collars located in spaced relation for operating on the sheet material and to locate the sheet material in position to be displayed, a pair of burrs, means for pressing the sheet material against the burrs, a driving mechanism and a driven mechanism for operating the said collars and burrs, the driving mechanism having means for intermittently operating on the driven mechanism for short periods of time separated by longer periods of time to move the sheet material to expose parts thereof, the driven mechanism having means for reversing the movement of the collars, and a means for operating the rolls to produce a surface movement of the rolls greater than the surface movement produced by the collars, and a frictional release between the said last named means and the rolls to maintain the sheet material taut in the vicinity of the rolls, and a means for connecting the driven means with either of the rolls.

In witness whereof I have hereunto signed my name to this specification.

DAVID SLOTSKY.